US005144860A

United States Patent [19]

Furuhashi et al.

[11] Patent Number: 5,144,860

[45] Date of Patent: Sep. 8, 1992

[54] ROTATION TRANSMITTING MECHANISM FOR STEERING WHEEL

[75] Inventors: Kenshi Furuhashi; Yoshinobu Sugiyama; Hitoshi Taguchi, all of Aichi, Japan

[73] Assignee: Kabushiki Kaisha Tokai Rika Denki Seisakusho, Aichi, Japan

[21] Appl. No.: 676,304

[22] Filed: Mar. 28, 1991

[30] Foreign Application Priority Data

Mar. 29, 1990 [JP] Japan .............................. 2-33257[U]

[51] Int. Cl.[5] .......................... B62D 1/04; H01H 3/16; B25G 3/28

[52] U.S. Cl. .................................. 74/552; 200/61.34; 200/61.35; 200/61.27; 200/61.54; 403/359; 403/364; 403/380

[58] Field of Search .......................... 74/552; 280/750; 403/364, 380, 359; 200/61.31, 61.33, 61.35, 61.54, 61.27, 61.34, 61.30

[56] References Cited

U.S. PATENT DOCUMENTS

| | | | |
|---|---|---|---|
| 2,094,416 | 9/1937 | Sheffield | 403/364 |
| 3,809,833 | 5/1974 | Miller et al. | 200/61.27 |
| 4,335,284 | 6/1982 | Ochiai et al. | 200/61.34 X |
| 4,570,041 | 2/1986 | Ishiguro | 200/61.54 |
| 4,578,608 | 3/1986 | Mech et al. | 403/364 |
| 4,662,775 | 5/1987 | Faul | 74/552 |
| 4,730,952 | 3/1988 | Wiley | 403/359 X |
| 4,739,131 | 4/1988 | Maeda | 200/61.35 X |
| 4,814,743 | 3/1989 | Hanaki | 200/61.35 X |
| 4,848,526 | 7/1989 | Fargier et al. | 403/359 X |
| 4,881,389 | 11/1989 | Alfon et al. | 74/552 X |
| 5,056,391 | 10/1991 | Stewart | 403/380 |

FOREIGN PATENT DOCUMENTS

| | | | |
|---|---|---|---|
| 0082997 | 7/1983 | European Pat. Off. | 200/61.54 |
| 1094610 | 8/1959 | Fed. Rep. of Germany | 74/552 |
| 189491 | 6/1989 | Japan . | |
| 383072 | 11/1932 | United Kingdom | 74/552 |
| 2058694 | 4/1981 | United Kingdom | 74/552 |

*Primary Examiner*—Vinh T. Luong

[57] ABSTRACT

A rotation transmitting mechanism for a steering wheel for use in an automobile. A rotational member of a coupling device has projections extending radially inwardly, while a cancel cam has corresponding U-shaped cutouts to receive the projections, respectively. Each projection has a tapered section tapering off to a bottom end thereof. A peripheral face forming each U-shaped cutout is rounded so that an outer surface of the cylindrical cancel cam is connected with an inner surface by a rounded perhipheral face forming the cutout.

4 Claims, 2 Drawing Sheets

ROTATION TRANSMITTING MECHANISM FOR STEERING WHEEL

BACKGROUND OF THE INVENTION

1. Field of the Invention

The present invention generally relates to a rotation transmitting mechanism for a steering wheel for use in an automobile. More particularly, it relates to a mechanism for transmitting a rotation of the steering wheel to a rotational member of a coupling device through a cancel cam for a turn signal lever.

2. Description of the Related Art

As well known, the steering wheel is provided with a horn switch, other switches, an air bag and the like which are electrically connected to the terminals arranged in a steering column to connect a power source. It is needless to say that the steering wheel is rotatable, while the steering column is fixed on the body of the automobile. Thus, the connection mechanism for the horn switch and the terminals must include such a coupling device as permitting the rotation of the steering wheel with respect to the steering column.

Conventionally, according to one of the coupling device for accomplishing the above-described requirement, there is provided a flat cable which allows the rotation of the steering wheel. According to another coupling device, there is provided a slip ring arranged on the steering column and a brush arranged on the steering wheel to cooperate with the slip ring.

In any case, the coupling device is, generally, so arranged as to surround a cancel cam which is mechanically coupled with the steering wheel. It is noted that the cancel cam functions as means for returning the turn signal lever to its neutral position when the steering wheel returns to its neutral position.

Conventionally, the rotation of the steering wheel is transmitted to a rotational member of the coupling device by means of the cancel cam. According to a prior art, for example Japanese Laid-Open Utility Model publication 1-89491, the rotational member is provided with a cylindrical lower part having a plurality of projections extending radially inwardly, while the cancel cam includes a sleeve portion having, at its upper circular end, the corresponding U-shaped cutouts for receiving the projections.

Meanwhile, when the steering wheel is assembled to the steering shaft and the steering column is arranged on the body of the automobile, it is unavoidable that the steering wheel and/or the steering column may be not slightly co-axial with the steering shaft due to the dimensional errors and the assembling errors of these members, resulting in the inconvenience of the engagement of the projections of the coupling device and the cancel cam. Namely, the projections may tightly contact the peripheral face of the U-shaped cutouts so that a squeaky noise due to the resulting large friction may be generated when the steering wheel is rotated, or the projections may be accidentally damaged. If the play between the projection and the U-shaped cutout was increased too much in order to avoid the above-mentioned problems, a noise due to the strike of the projections against the peripheral face of the U-shaped cutouts would be generated.

SUMMARY OF THE INVENTION

Accordingly, an essential object of the present invention is to provide a rotation transmitting mechanism for a steering wheel in which the projections of the coupling device can be easily engaged with the U-shaped cutouts of the cancel cam with a moderate play therebetween even though the steering column and steering wheel are not co-axial with the steering shaft.

In accomplishing this and other objects, according to the present invention, there is provided a rotation transmitting mechanism for a steering wheel for use in an automobile having the following construction;

The mechanism includes a steering column to be fixed on a body of the automobile, a steering wheel rotatable with respect to the steering column, a cylindrical cancel cam arranged below the steering wheel so as to rotate along with the steering wheel, and a coupling device for electrically connecting a member arranged on the steering wheel with power source terminals arranged in the steering column. The coupling device includes a rotational member surrounding the cancel cam.

One of the rotational member of the coupling device and the cancel cam has projections extending radially. The other of the rotational member of the coupling device and the cancel cam has corresponding U-shaped cutouts to receive projections, respectively. Each projection has a tapered section tapering off to a bottom end thereof.

Preferably, a peripheral face forming each U-shaped cutout is rounded so that an outer surface of the cylindrical cancel cam is connected with its inner surface by means of a rounded peripheral face forming the cutout.

With the above-described arrangement, even though the coupling device and/or the cancel cam is not co-axial with the steering shaft, the bottom ends of the projections is prevented from tightly contacting with the peripheral face of the cutout because the above bottom end is narrow and the peripheral face is rounded.

Therefore, according to the embodiment of the present invention, even though the cancel cam and the coupling device are not completely co-axial with the steering shaft, the projections extending from the coupling device can be engaged with the corresponding cutouts with soft contact therebetween, resulting in prevention of the possible noise generated therebetween and the damage of the projections.

BRIEF DESCRIPTION OF THE DRAWINGS

This and other objects and features for the present invention will become apparent from the following description taken in conjunction with the preferred embodiment thereof with reference to the accompanying drawings, in which.

DETAILED DESCRIPTION OF THE INVENTION

Figure 1:
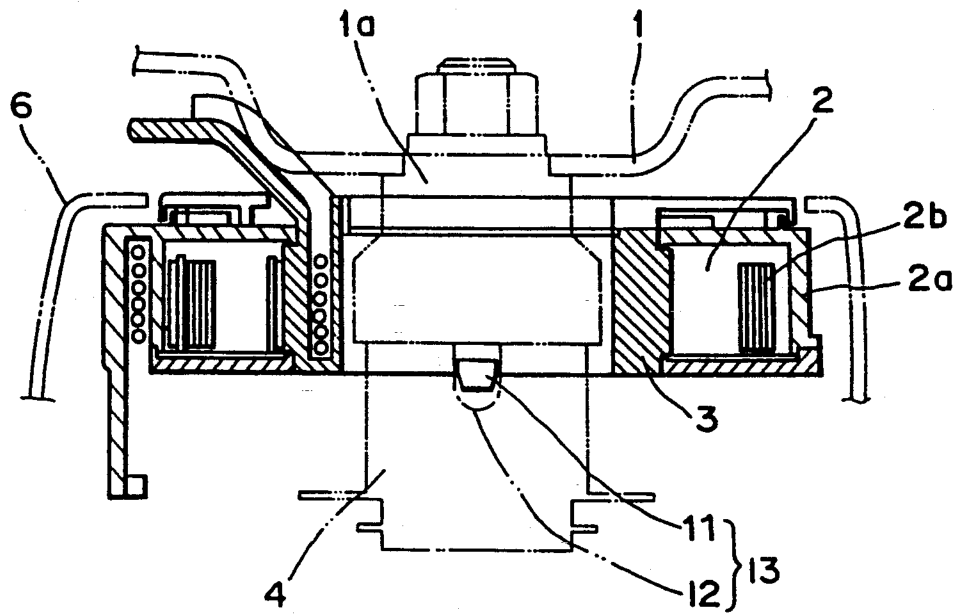
FIG. 1 is a sectional view showing an essential part including a coupling device, according to an embodiment of the present invention.

Before the description of the present invention proceeds, it is to be noted that like parts are designated by like reference numerals throughout the accompanying drawings.

Figure 2:
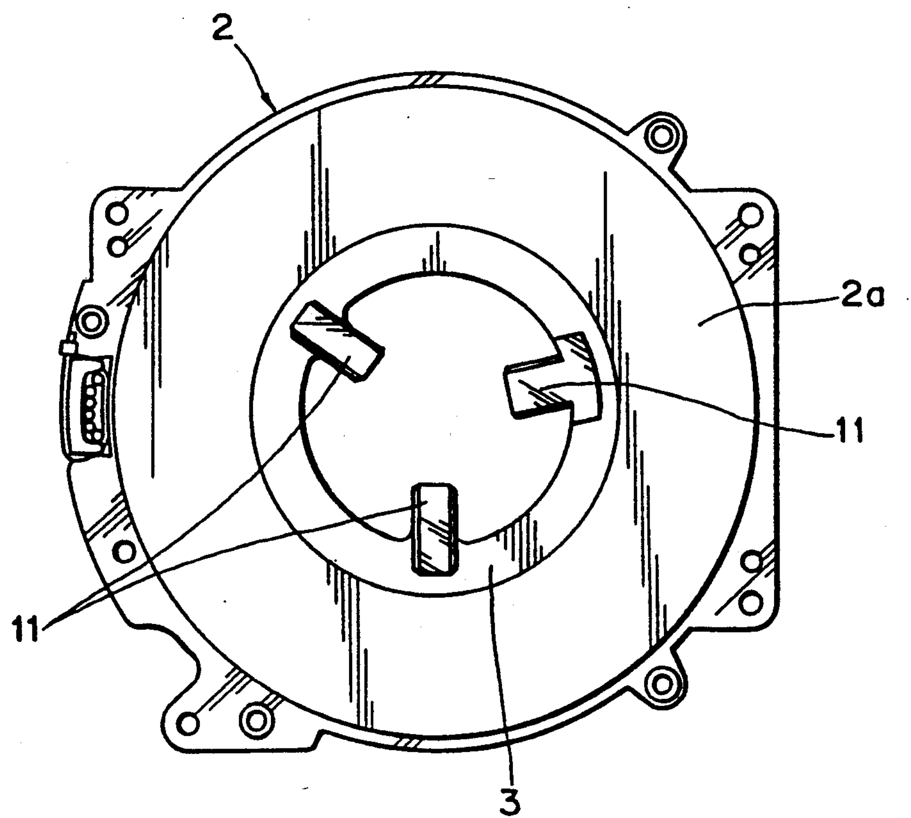
FIG. 2 is a bottom view of FIG. 1.

Referring first to FIGS. 1 and 2, a reference numeral 1 denotes a steering wheel below which a steering column 6 and a coupling device 2 is arranged. The steering column 6 is fixed on a body of the automobile.

The steering wheel has, at its center, a boss 1*a* which fixedly receive an upper end of a steering shaft (not shown). A cancel cam is arranged below the boss 1*a* of the steering wheel 1.

The coupling device includes a upper housing member 2*a* which is secured on the steering column 6, and a lower housing member 3 which constitutes a housing of the coupling device in association with the upper housing member 2*a* to accommodate a flat cable 2*b* for connecting a horn switch provided on the steering wheel 1 to the power source terminals (not shown) arranged in the steering column 6. The lower housing member 3 is designed to rotate together with the steering wheel 1 with respect to the upper housing member 2*a*. One end of the coil-like flat cable 2*b* is fixed on the rotational lower housing member 3 to be connected with the horn switch, while the other end thereof is fixed on the upper housing member 2*a* to be connected with the power source terminals. When the rotational housing member 3 rotates along with the steering wheel 1, the coil-like flat cable 2*b* may absorb their rotation by expanding and reducing its coil's radius.

Figure 3:
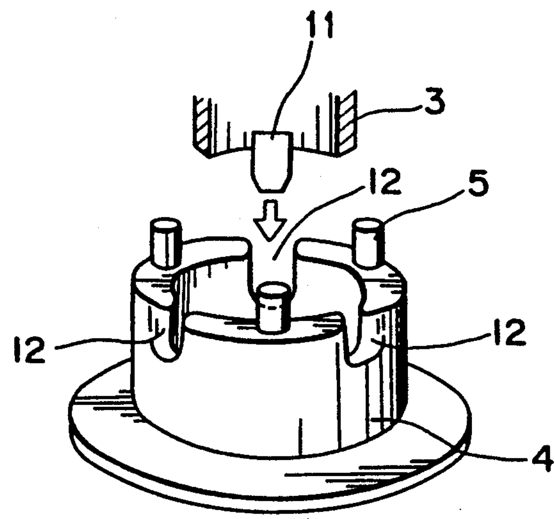
FIG. 3 is a perspective view illustrating a cancel cam and a rotational member of the coupling device to be engaged with the cancel cam.
Figure 4:
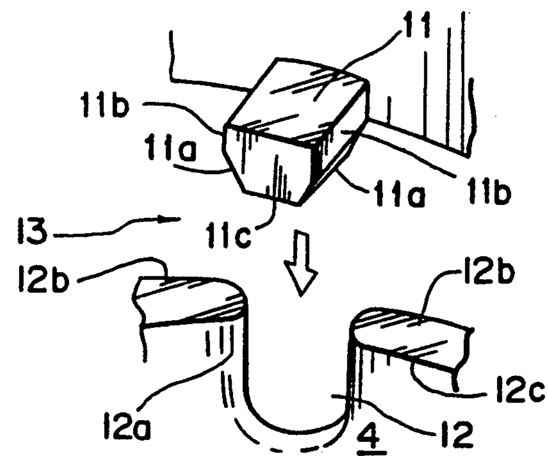
FIG. 4 is a perspective view illustrating a projection and a U-shaped cutout to be engaged with the projection, and FIGS. 5(*a*) and 5(*b*) are, respectively, explanatory views showing an operation of the projection and the cutout.

The cancel cam 4 is urged upwardly by a spring (not shown) toward the boss 1*a* of the steering wheel 1. As shown in FIG. 3, the cancel cam has a plurality of pins 5 which are to fit in the corresponding holes (not shown) formed in the lower face of the boss 1*a*. Thus, the cancel cam 4 can rotate along with the steering wheel 1.

In order to connect the cancel cam 4 with the rotational lower hosing member 3 of the coupling device, there is provided engagement mechanism 13. Namely, the housing member 3, having a cylindrical inner surface, is provided with three projections 11 extending radially inwardly from the lower end thereof, while the cylindrical cancel cam 4 is provided with the corresponding U-shaped cutouts 12 formed in the end face thereof, as shown in FIGS. 1–4.

It is noted that each projection 11 has a pair of side faces 11*b* and a bottom face 11*c*. Furthermore, a chamfer 11*a* is formed at the corner between the faces 11*b* and 11*c*. Namely, the projection 11 tapers off to the bottom end thereof. On the other hand, the peripheral face of the cylindrical wall of the cancel cam 4 forming the U-shaped cutout 12 is rounded. Namely, the outer surface 12*b* is connected with the inner surface 12*c* by means of the rounded peripheral face 12*a*.

Figure 5A:
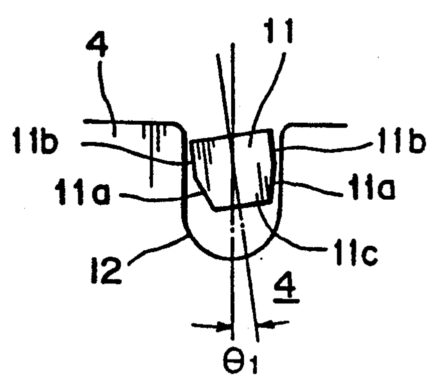
Figure 5B:
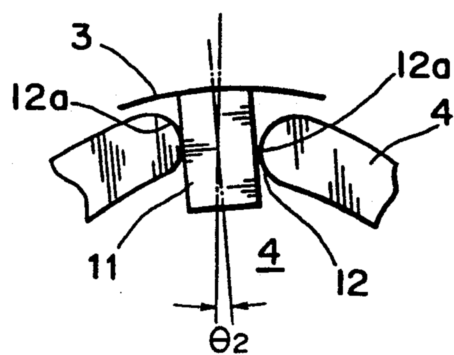

With the arrangement as described above, even though the coupling device and the cancel cam 4 is not co-axial by an angle $\theta 1$ in a direction as shown in FIG. 5*a*, the corner between the side face 11*b* and the bottom face 11*c* is prevented from tightly or strongly contacting with the rounded face 12*a* of the cutout 12 because the above corner is formed as a chamfer 11*a*. Furthermore, even though the coupling device and the cancel cam 4 is not co-axial by an angle $\theta 2$ in a direction as shown in FIG. 5*b*, the projection 11 is prevented from tightly contacting with the peripheral face 12*a* of the cutout 12 because the face 12*a* is rounded.

Therefore, according to the embodiment of the present invention, even though the cancel cam and the coupling device are not completely co-axial, the projections extending from the coupling device can be engaged with the corresponding cutouts with soft contact each other, resulting in prevention of generation of the squeaky noise and the damage of the projections.

Alternatively, the projections 11 and the cutouts 12 may be replaced by each other. Namely, the projections 11 may be arranged to extend radially outwardly from the cancel cam 4, while the cutouts 12 may be formed in the lower end of the rotational member 3.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A rotation transmitting mechanism for a steering wheel for use in an automobile comprising

- a steering column to be fixed on a body of the automobile,
- a steering wheel rotatable with respect to the steering column,
- a cylindrical cancel cam arranged below the steering wheel so as to rotate along with the steering wheel, and
- a coupling device for electrically connecting a member arranged on the steering wheel with power source terminals arranged in the steering column, which includes a rotational member surrounding the cancel cam,
- one of the rotational member of the coupling device and the cancel cam having projections extending radially, the other of the rotational member of the coupling device and the cancel cam having corresponding U-shaped cutouts to receive, respectively, the projections, each projection having a tapered section tapering off to a bottom end thereof.

2. A rotation transmitting mechanism for a steering wheel for use in an automobile comprising

- a steering column to be fixed on a body of the automobile,
- a steering wheel rotatable with respect to the steering column,
- a cylindrical cancel cam arranged below the steering wheel so as to rotate along with the steering wheel, and
- a coupling device for electrically connecting a member arranged on the steering wheel with power source terminals arranged in the steering column, which includes a rotational member surrounding the cancel cam,
- one of the rotational member of the coupling device and the cancel cam having projections extending radially, the other of the rotational member of the coupling device and the cancel cam having corresponding U-shaped cutouts to receive, respectively, the projections, a peripheral face forming each U-shaped cutout being rounded so that an outer surface of the cylindrical cancel cam is connected with its inner surface by means of a rounded peripheral face forming the cutout.

3. A rotation transmitting mechanism for a steering wheel for use in an automobile comprising a steering column to be fixed on a body of the automobile, a steering wheel rotatable with respect to the steering column, a cylindrical cancel cam arranged below the steering wheel so as to rotate along with the steering wheel, and a coupling device for electrically connecting a member arranged on the steering wheel with power source terminals arranged in the steering column, which includes a rotational member surrounding the cancel cam, one of the rotational member of the coupling device and the cancel cam having projections extending radially, the other of the rotational member of the coupling device and the cancel cam having corresponding U-shaped cutouts to receive, respectively, the projections, each projection having a tapered section tapering off to a bottom end thereof, a peripheral face forming each U-shaped cutout being rounded so that an outer surface of the cylindrical cancel cam is connected with its inner surface by means of a rounded peripheral face forming the cutout.

4. The rotation transmitting mechanism according to claim 3, wherein said each projection has a pair of side faces and bottom face, a corner between said each side faces and the bottom face being a chamfer.

* * * * *